Figure 1:
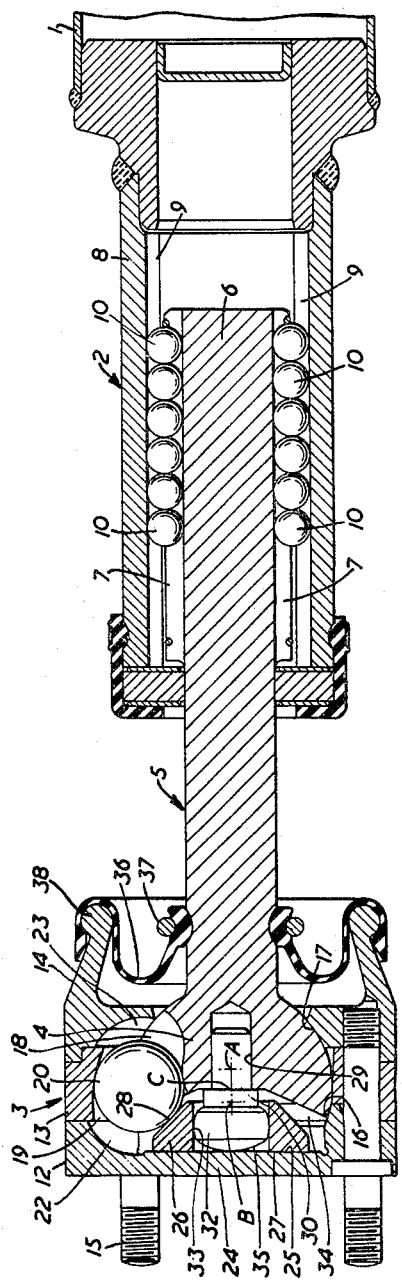

June 1, 1965 W. CULL 3,186,189
UNIVERSAL JOINTS
Filed Dec. 17, 1962 2 Sheets-Sheet 1

INVENTOR
WILLIAM CULL
BY
Irwin S. Thompson
ATTORNEY

June 1, 1965     W. CULL     3,186,189
UNIVERSAL JOINTS

Filed Dec. 17, 1962     2 Sheets-Sheet 2

INVENTOR
WILLIAM CULL
BY
ATTORNEY

United States Patent Office 3,186,189
Patented June 1, 1965

3,186,189
UNIVERSAL JOINTS
William Cull, Hest Bank, near Lancaster, England, assignor to Birfield Engineering Limited, London, England
Filed Dec. 17, 1962, Ser. No. 245,266
Claims priority, application Great Britain, Dec. 15, 1961, 45,018/61
8 Claims. (Cl. 64—21)

This invention relates to universal joints of the constant velocity ball type. Joints of this type normally comprise grooved inner and outer members, which alternatively form the driving and driven members of the joint, coupled by a series of intermediate members in the form of torque-transmitting balls. The grooves form ball tracks and each of the balls engages one of the tracks in the inner member and a corresponding track in the outer member.

For true (or substantially true) constant velocity characteristics it is essential for movement of the balls to be accurately guided so that the ball centres always lie substantially in the median plane of the joint. The median plane contains the joint centre and is equally inclined to the rotational axes of the inner and outer members.

Guide means are commonly provided to guide the balls so that for all joint angles the centres thereof lie in the corresponding median plane, although joints have been developed in which the ball tracks in the inner and outer members converge and act to produce the necessary guiding force on the balls.

The object of the invention is to provide a new or improved joint construction in which guide means and track convergence cooperate to guide the balls accurately, and to this end the track convergence urges the balls towards a guide member of the guide means which acts to locate the balls axially of the outer joint member and slides in a plane disposed radially of the axis of the latter member. Sliding movement of the guide member is controlled in accordance with the relative angularity of the inner and outer joint members, and movement of the guide member may result from engagement of that member by the inner member or a projection therefrom.

The guide member has a guide surface facing towards the balls which is of the requisite shape to provide the correct guiding action, and in general this surface will be of substantially frusto-conical shape. The actual shape of this surface is developed to provide the necessary ball location for all joint angles. The action of the converging ball tracks is, in effect, to apply a force to the balls tending to "squeeze" the latter out of the tracks towards the guide member. The balls may be uncaged so that they are urged individually into contact with the guide surface, such contact locating the balls accurately, or alternatively the balls may be caged and the ball cage engaged by the guide surface.

Track convergence is achieved by having the arcuate tracks of the two members centred about different points which are both spaced from and located on opposite sides of the joint centre. These points both lie on the joint axis in the condition of no angularity, i.e. zero joint angle.

The angle of convergence of the tracks has to be great enough to produce the necessary guiding force on the balls, and must in any case be greater than the angle of friction between the balls and tracks under load; however, increasing the angle of convergence also decreases the maximum angularity which can be accommodated and for this reason it is normally desirable to keep the convergence as small as possible. The limit on the angle of convergence is thus set by design considerations which must provide a compromise between producing the necessary controlling force on the balls and the maximum joint angle.

Figure 2:
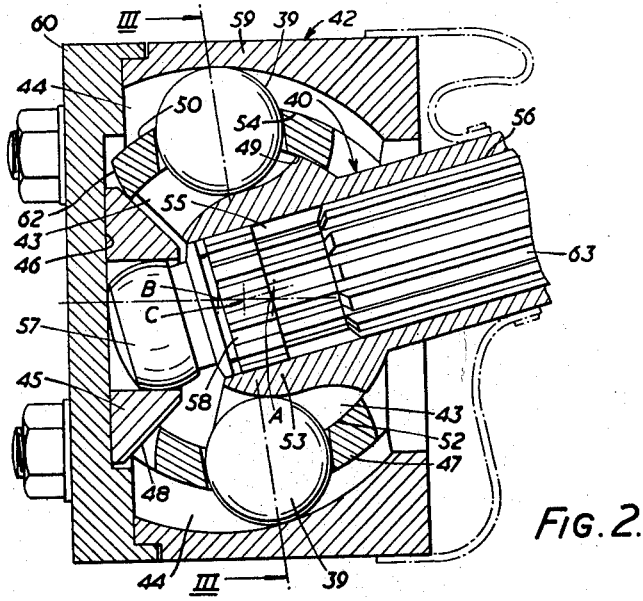
Figure 3:
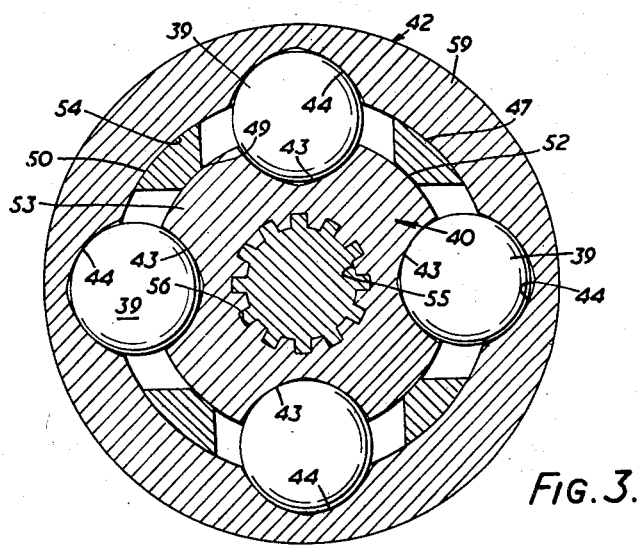

The invention will now be further described with reference to the accompanying drawings which illustrate, by way of example, two constant velocity joints of the ball type representing embodiments of the invention. In the drawings:

FIGURE 1 is an axial sectional view in two radial planes inclined at 135° of one of the embodiments built into a motor vehicle transmission shaft, FIGURE 2 is a similar view of the other embodiment, and FIGURE 3 is a sectional view on the line III—III in FIGURE 2.

The joint of FIGURE 1 is connected to a central tubular section 1 of the transmission shaft through a rolling spline coupling 2 which accommodates the variations in effective axial length or "plunge" of the shaft. An outer composite pot-like member 3 of the joint has centred within it a ball end 4 of an inner joint member 5. An outer end shaft portion 6 of the member 5 has a series of axially directed grooves 7 and forms the inner member of the coupling 2 the outer member 8 of which is similarly grooved at 9. A series of balls 10 engages each corresponding pair of grooves 7 and 9 and allows relative axial movement of the coupling members 6 and 8 with a smooth rolling action.

The outer member 3 comprises an inner end portion 12, a middle portion 13 and an open-centred outer end portion 14 through which the shaft portion 6 of the member 5 projects. The three portions 12, 13 and 14 are clamped together by a ring of fixing studs such as 15 which enable the outer member 13 to be attached in the transmission system. Internally the two end portions 12 and 14 are formed at 16 and 17 to define between them a part-spherical seating engaged by and centring the ball end 4 of the member 5. The ball end 4 and the middle portion 13 of the member 3 are each formed with four equiangularly spaced grooves such as 18 and 19 of elliptical cross-section and forming arcuate ball tracks. The tracks 18 and 19 in the members 5 and 3 are centred about different points A and B which are spaced from and on opposite sides of the joint centre C, so that the tracks 18 and 19 converge outwardly of the outer member 3, i.e. towards the left in FIGURE 1; the three centres A, B and C, as shown, lie on the joint axis in a condition of no angularity.

Four balls such as 20 forming intermediate torque-transmitting members of the joint each engage one of the tracks 19 in the outer member 3 and a corresponding track 18 in the inner member 5. The end portions 12 and 14 are each cut away at four places such as 22 and 23 to provide clearance for the balls 20 at maximum joint angularity.

The end portion 12 has an end wall 24 which provides an inwardly facing thrust surface 25 arranged normal to the longitudinal, i.e. rotational, axis of the outer member 3. A guide member in the form of a guide ring 26 has a flat surface 27 which engages and slides on the thrust surface 25 and an oppositely facing guide surface 28 of generally frusto-conical shape. The formation of the tracks 18 and 19 and the guide ring 26 is such that for any joint angle there is a corresponding position of the guide ring 26 in which all four balls 20 have their locations controlled on the one hand by the tendency of the convergent tracks to "squeeze" the balls 20 out of the tracks 18 and 19 towards the guide ring 26 and on the other hand by engagement of the balls with the guide surface 28. The surface 28 does not follow a true geometrical cone, but is developed to control the balls 20 in the necessary manner.

The inner end of the member 5 is axially bored at 29 to fit the stem of a guide pin 30 with a projecting ball end 32 which engages within a central control bore 33 of the guide ring 26. This engagement acts to move the guide ring 26 to the correct ball control position as the joint angularity changes, and the inner end of the inner member is undercut at 34 to accommodate the ball end 32 of the guide pin 30 and the guide ring 26 and also to provide adequate clearance therefor during joint operation.

The end face 35 of the guide pin is part-spherical and centred about the joint centre C, this face being arranged to engage the thrust surface 25. This assists in locating the inner member 5 accurately in the axial sense within the outer member 3.

The end portion 14 of the member 3 is extended around the shaft portion 6 of the member 5 to form a shroud within which is positioned a flexible sealing boot or gaiter 36 which is clamped to the inner member 5 by a ring 37 just within the outer member 3 and extends around a bulbous outer end rib 38 of the outer member 3 to seal the joint.

A maximum angularity or joint angle of the order of 20° is obtainable with the joint just described, and the angle of convergence of the tracks 18 and 19 is approximately 14°6′. The angle of convergence is the angle between corresponding tangents to associated ball tracks 18 and 19 of the inner and outer members 5 and 3.

An identical joint, apart from the form of the shaft portion 6, can be used at the opposite end of the tubular shaft section 1 to complete the shaft assembly.

The other embodiment of FIGURES 2 and 3 also has four balls such as 39 coupling inner and outer members 40 and 42 formed with similarly convergent grooves 43 and 44 which act to urge the balls 39 towards a generally similar guide ring 45 which again slides on a thrust surface 46 in a plane disposed radially of the rotational axis of the outer member 42. In this case, however, a ball cage 47 is provided and it is this which engages the guide surface 48 of the guide ring 45 to provide accurate location of the balls 39 in the median plane of the joint.

The ball cage 47 is provided to improve the sliding conditions between the inner and outer members 40 and 42, and it has internal and external part-spherical surfaces 49 and 50 which respectively engage a mating surface 52 on the ball end 53 of the inner member 40 and an internal seating 54 in the outer member 42. This acts to centre the inner member 40 within the outer member 42 for all joint angles. As the cage 47 engages the guide ring 45 to guide the balls 39 the guiding action of the cage 47 does not materially increase the friction between the latter and the inner and outer members 40 and 42.

A through bore 55 in the inner member 40 is formed with internal splineways such as 56 for engagement by a splined shaft portion 63 form a coupling to accommodate "plunge," i.e. relative axial movement of shaft portions coupled by the joint. A guide pin 57, which operates in the same manner as the guide pin 30 already described, has a splined stem 58 which fits in the inner end of the bore 55.

The outer member 42 is again of composite form and in this case formed in two portions 59 and 60 bolted together; a main tubular portion 59 formed with the internal seating 54 and the outer ball tracks 44, and an end portion 60 forming in effect an end closure plate. The latter portion 60 presents the inwardly facing thrust surface 46 on which the guide ring 45 slides under the control of the guide pin 57.

As before, the shape of the guide surface 48 on the guide ring 45 is generally frusto-conical but is developed to provide the necessary guiding action. The inner end 62 of the ball cage 47 which engages the guide surface 48 is also suitably contoured to the same end.

When a ball cage is used, as in the embodiment of FIGURES 2 and 3, a somewhat less guiding force on the balls 39 resulting from the track convergence will suffice, and hence the angle of such convergence can be correspondingly reduced. The inner and outer ball tracks 43 and 44 are again centred about points A and B spaced along the joint axis, on opposite sides of the joint centre C.

The ball tracks or grooves 18 and 19, or 43 and 44, in the inner and outer members are in each case of similar elliptical cross-section. The form of the grooves is chosen to provide a pressure angle of 45°, this being the angle at the centre of each torque-transmitting ball 20 or 39 between a radius, through either of the two areas of contact of the ball with the flanks of each groove which it engages, and a line through the ball centre and tangential to the pitch circle of the balls.

For assembly purposes the cage 47 of the embodiment of FIGURES 2 and 3 is split circumferentially in the plane of the centres of the balls 39. This enables the cage 47 to be assembled on the ball end 53 of the inner member 40.

I claim:
1. A constant velocity universal joint comprising inner and outer joint members having cooperating arcuate ball tracks in which are located torque transmitting balls, means retaining said inner and outer joint members in assembled relationship, said arcuate ball tracks in the inner and outer joint members being respectively centred about different points which are both spaced from and located on opposite sides of the joint centre on the joint axis in the condition of zero joint angle so that the bases of each pair of tracks converge as seen in cross section, whereby the resultant track convergence in use urges the balls on one axial direction, and including a wall member secured to said outer joint member and affording a plane surface perpendicular to the axis of said outer joint member, a guide member which is arranged to slide on said plane surface and which acts on the balls to urge the balls in the axial direction opposite to said one direction to locate the balls axially in relation to the said outer joint member, and guide means connected to said inner joint member and engaging said guide member to position of the latter in accordance with the relative angularity of the inner and outer joint members, and thus maintain the balls in the median plane of the joint.

2. A universal joint according to claim 1, wherein the guide member is in the form of an annular guide ring with a central bore and the guide means comprises a projection from said inner joint member which engages in said bore.

3. A universal joint according to claim 3, wherein said projection is provided by a guide pin fitted into the end of the inner joint member and formed with a rounded end having a spherical surface which engages the guide member bore.

4. A universal joint according to claim 2, wherein the guide means also engages and slides on the plane surface afforded by said wall member.

5. A universal joint according to claim 1, wherein a guide surface on said guide member facing towards the balls is of substantially frusto-conical shape.

6. A universal joint according to claim 1, wherein the balls are uncaged so that they are urged into contact with the guide member, such contact locating the balls accurately axially of the outer member.

7. A universal joint according to claim 1, wherein said wall member is formed separately from, and attached to, said outer joint member.

8. A universal joint according to claim 1, including a cage having apertures to receive and locate the balls, the cage being engaged and positioned by the guide member.

References Cited by the Examiner

UNITED STATES PATENTS

| | | | |
|---|---|---|---|
| 1,022,909 | 4/12 | Whitney | 64—23 |
| 1,975,758 | 10/34 | Stuber | 64—21 |
| 2,046,584 | 7/36 | Rzeppa | 64—21 |
| 2,615,317 | 10/52 | Rzeppa | 64—21 |

FRANK SUSKO, *Primary Examiner.*